UNITED STATES PATENT OFFICE.

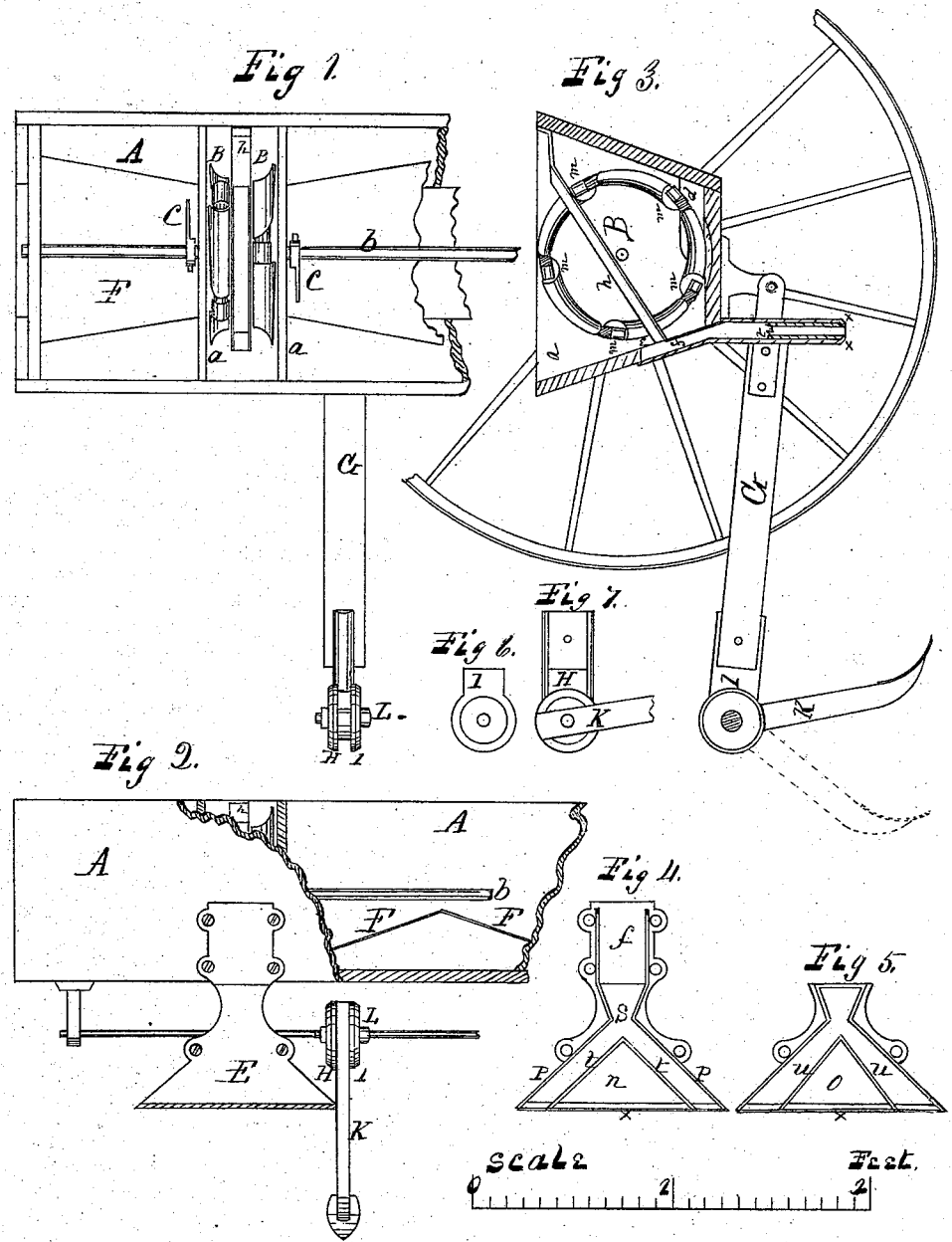

MARQUIS L. GORHAM, OF ROCKFORD, ILLINOIS.

IMPROVEMENT IN SEEDING-MACHINES.

Specification forming part of Letters Patent No. 154,665, dated September 1, 1874; application filed March 15, 1872.

*To all whom it may concern:*

Be it known that I, MARQUIS L. GORHAM, of Rockford, in the county of Winnebago and State of Illinois, have invented certain Improvements in Seeding-Machines, of which the following is a specification:

Whereas machines have been devised and used for sowing seeds of different kinds, and which are supported on carrying-wheels, with seed-box and seed-distributing wheels placed within the seed-box, between partitions with scatterers and cultivator-teeth attached; and whereas Letters Patent No. 32,992, dated August 6, 1861, and No. 93,529, dated August 10, 1869, and No. 102,535, dated May 3, 1870, were issued to me for improved seeding-machines of this class; now the object of this invention is to improve these machines, and relates to the parts employed in the distribution of the seed and the cultivator-teeth.

In the drawings in this case I have only represented a portion of the seed-box composed of about one section.

Figure 1 is a plan view of a section of the seed-box with seed-distributing wheels and cultivator-tooth attached. Fig. 2 is a rear elevation with seed-scatterer attached. Fig. 3 is a transverse section cut through the center between seed-distributing wheels. Figs. 4 and 5 represent the inside of seed-scatterer. Figs. 6 and 7, inside of clamp which holds the cultivator-tooth.

A represents the seed-box, which is substantially the same as that employed by me in my former patents, and is provided with transverse vertical partitions $a$, forming an inclosure in which is placed the seed-distributing wheels B, which are provided with tubular hubs, the ends of which are clutched to receive clutched stirrers C, and are secured to the shaft $b$ by set-screws. These wheels have their bearings in partitions $a$. Underneath the partitions $a$ are openings $d$ to admit the seed from the seed-box to the seed-distributing wheels. There is also an opening, $e$, in the side of the seed-box A between partitions $a$, in which the trough $h$ terminates, and through which the seed is discharged into the spout K of scatterer E. F represents inclined bottoms in seed-box A for the purpose of conducting the seed to the openings $d$. The wheels B are provided with seed-cups $m$ upon their peripheries, placed at about right angles to a radial line, and the portion of the periphery between the seed-cups is beveled on one side only, for the purpose of deflecting the seed as it falls from the cups all on one side thereof. These wheels, separately considered, are substantially the same as those employed in the patent issued to me dated August 10, 1869, No. 93,529.

In this case I have constructed the seed-distributing wheels B in pairs, with beveled deflecting-surfaces on opposite sides, and have placed them in seed-box A between partitions $a$, on shaft $b$, with their beveled deflecting-surfaces toward each other, and in such a manner that the seed-cups $m$ of one wheel shall be opposite to the beveled deflecting-surface of the other wheel. $h$ is an inclined conducting-trough placed between the seed-distributing wheels B, and terminates in opening $e$, which connects with spout $f$ of scatterer E. In the revolution of the seed-distributing wheels B the seed will be lifted from the bottom of the seed-box A by seed-cups $m$, and will be discharged therefrom alternately in quick succession into the conducting-trough $h$, which will insure a more equal distribution of the seed than can be had when only one seed-wheel is employed. This constitutes the first part of my invention.

E is a scatterer, which is composed of plates $n$ and $o$. On $n$, P are flanges, which rise above the plane of the plate, the upper portions of which are fitted to opening $e$ in seed-box A, and is secured in place thereto by screws or otherwise. The inside of opening $e$ below the trough $h$ is covered with a suitable plate, which forms a spout, $f$, to conduct the seed to the scatterer. The lower portion of spout $f$ at $s$ is narrowed by changing the direction of the flanges $p$ inward, so as to form a narrow passage from the spout to the scatterer. The portion below the narrowed neck of the spout is the scatterer proper, and is widened in the direction of the length of the seed-box to such an extent, in this instance, as that the flanges $p$ are nearly at right angles to each other, and if produced would meet above the neck of spout $f$. These flanges form the outer walls of the edges of the scatterer. $t$ are ribs, which rise above the plane of plate $n$, and, in this instance, are about parellel to flanges $p$. In plate $o$, $u$ are ribs, similar to those in $n$, but, in this instance, are placed at a more acute angle with each other. This plate is fitted to the flanges $p$ in $n$. These plates form the outer walls of the sides of the scatterer, and are secured to each other by screws or otherwise. The lower edges of plates $n$ and $o$ at $x$ are beveled inward in such a manner as to narrow the space between the plates through which the seed is discharged. There is a free central space throughout the length and height of the scatterer.

The seed on its passage from trough $h$ through spout $f$ will strike the apex of the angles formed by the ribs $t$ and $u$ and will be deflected in the direction of the length of the scatterer, and, as it descends, portions thereof will fall over the ribs, and will strike the beveled edges X, which will deflect it forward and rearward; and when the machine is used to seed hill-sides, where one end of the seed-box will be higher than the other, then the seed on its passage to the scatterer will strike on that portion of the edge walls which are angled inward on the side of the machine which is the lowest, and will be deflected onto the ribs $t$ and $u$ on the opposite side from the side of the throat on which it first strikes; and when the machine is used for seeding in ascending and descending abrupt, sharp, or even moderate grades, where the scatterer will be changed from a vertical position, in such cases the seed falling from the spout K will strike on the lower side wall of the scatterer, and the ribs thereon will carry a proper portion of the seed toward the extreme ends of the scatterer, and give a more wide-spread equal distribution of the seed than could be had without the ribs. This will be the effect both in ascending and descending grades, and, when used in windy weather, the current will strike the outside of the beveled edges $x$ and be deflected below the opening between them, and will not only prevent an upward current of air through the scatterer, which would tend to lessen the velocity and force of the falling grain, and greatly unequalize the distribution thereof, but will cause a downward current of air through the scatterer, which will increase the velocity and force of the falling grain, which will be carried farther and give a more equal distribution than can be had in windy weather without the inward beveling edges.

G is a drag-bar of usual form, which may be secured to the machine in any suitable manner. To its rear end is secured a disk, H, which is fitted with flanges to receive the projecting portion of disk I in such a manner that when placed together they will retain their relative position. The insides of these disks are made concave, except a rim round their outer edge, and are provided with a center hole to receive a bolt. K is a cultivator-tooth of the usual form, the upper end of which is pierced to correspond to the holes in the disks. The tooth K is placed between the disks H and I, and is secured in place by tension-bolt L.

By means of this device I am enabled to adjust the tooth to a proper working angle, and, by means of the tension-bolt, can hold it sufficient for the cultivation of the soil, and in such a manner that when it meets with any obstruction offering a greater resistance than the strength of the tooth will bear will yield to pass such obstruction without injuring the tooth. This constitutes the third part of my invention.

What I claim is—

In a seeding-machine, the inward beveling edges X, in combination with the side and flaring end walls, ribs $t$ and $u$, and narrowed throat $s$, as and for the purpose set forth.

MARQUIS L. GORHAM.

Witnesses:
E. N. J. BEHEL,
J. E. BEHEL.